L. MAYER.
WHEEL AND JOURNAL.
APPLICATION FILED MAY 5, 1910.

1,029,762.

Patented June 18, 1912.

Witnesses:
W. H. Souba
E. C. Skinkle

Inventor:
Louis Mayer,
By his Attorneys
Williamson Merchant

COLUMBIA PLANOGRAPH CO., WASHINGTON, D. C.

UNITED STATES PATENT OFFICE.

LOUIS MAYER, OF MANKATO, MINNESOTA.

WHEEL AND JOURNAL.

1,029,762.  Specification of Letters Patent.  Patented June 18, 1912.

Application filed May 5, 1910. Serial No. 559,542.

*To all whom it may concern:*

Be it known that I, LOUIS MAYER, a citizen of the United States, residing at Mankato, in the county of Blue Earth and State of Minnesota, have invented certain new and useful Improvements in Wheels and Journals; and I do hereby declare the following to be a full, clear, and exact description of the invention, such as will enable others skilled in the art to which it appertains to make and use the same.

My invention has for its object to provide an improved wheel and journal especially adapted for use on automobiles or motor propelled vehicles and, to this end, the invention consists of the novel devices and combination of devices hereinafter described and defined in the claims.

The improved wheel and journal herein disclosed and claimed is also disclosed in my two companion applications, the one entitled "Vehicle running gear," filed May the 5th 1910 under Serial Number 559,543, and the other entitled "Knuckle connection and drive for vehicle wheels," filed May the 5th 1910 under Serial Number 559,544.

The invention is illustrated in the accompanying drawings wherein like characters indicate like parts throughout the several views.

Figure 1:
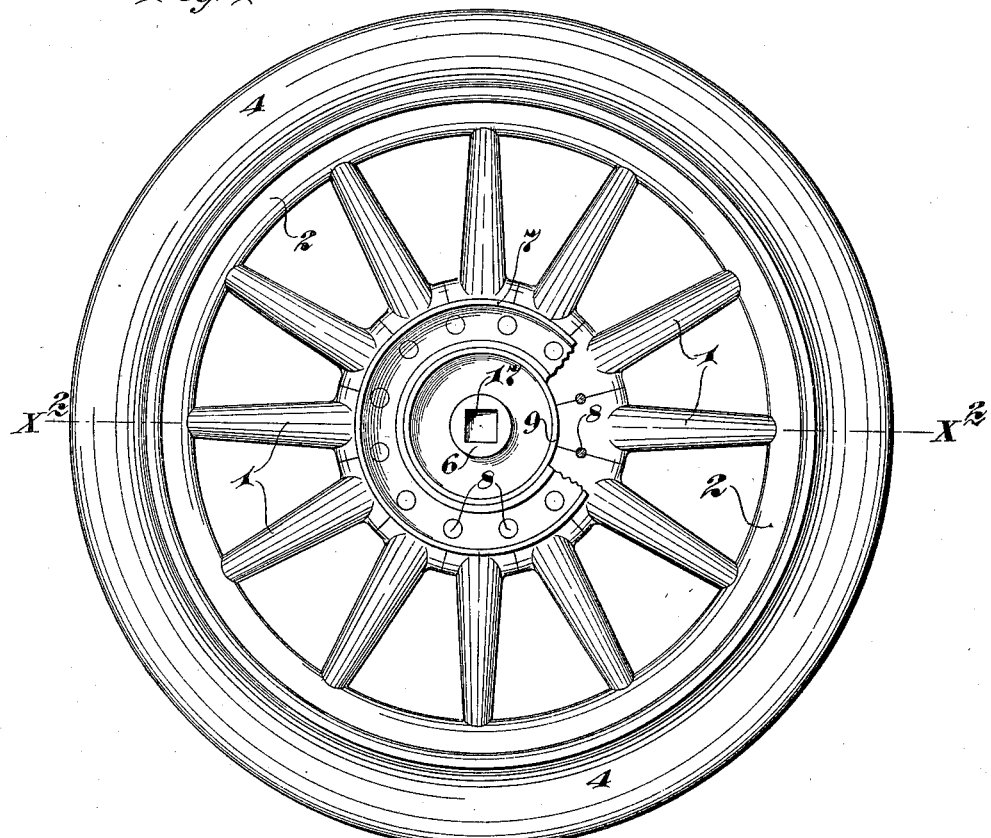
Figure 2:
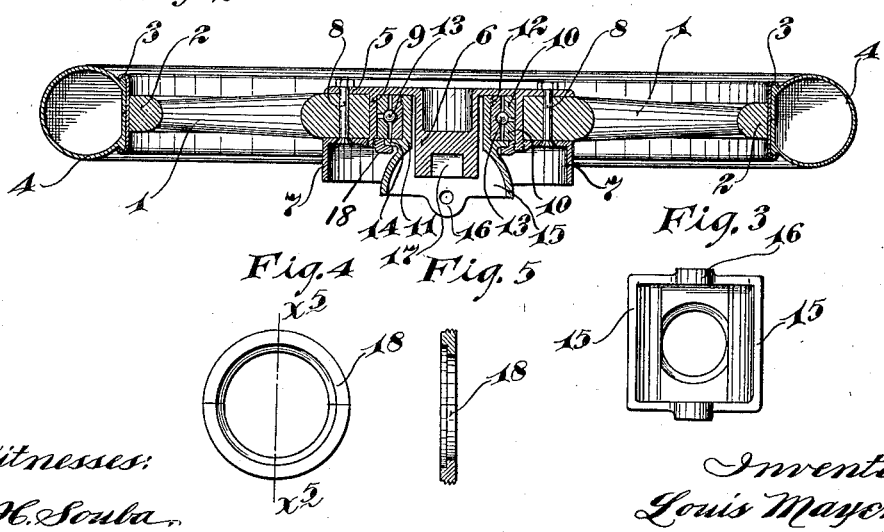
Figures 3, 4, 5:
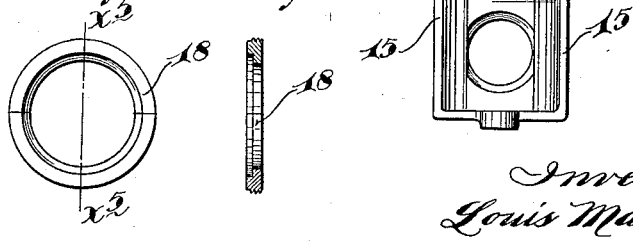

Referring to the drawings, Figure 1 is a view in side elevation, with some parts broken away and some parts removed, showing the improved wheel; Fig. 2 is a section taken on the line $x^2$ $x^2$ of Fig. 1, showing the wheel and journal therefor; Fig. 3 is a detail in elevation, looking at the inner end of the so-called wheel trunnion, showing the same removed from the wheel; Fig. 4 is an elevation of the split lock ring; and Fig. 5 is a section taken on the line $x^5$ $x^5$ of Fig. 4.

As shown, the wheel spokes 1, at their outer ends, are secured to a felly 2 that is provided with a rim 3 which holds a pneumatic tire 4 in the customary or any suitable way. The inner ends of the spokes are rigidly clamped to the disk-like flange 5 of a wheel hub 6. As shown, the said spokes are clamped to the said flange 5 and to the annular web of a brake flange 7, by means of nutted bolts 8. The inner ends of the spokes abut against a cylindrical flange 9 that projects laterally from the flange 5 and surrounds the hub 6 at a distance considerably outward thereof. The annular web of the brake flange 7 is preferably slipped onto the cylindrical flange 9, and a divided roller runway 10 is seated within the cylindrical flange 9.

A hollow or tubular wheel trunnion 11 loosely surrounds the wheel hub 6 and, as shown, is provided with an externally grooved ball runway 12, between which and the ball runway 10, bearing rollers 13 are interposed. The trunnion 11, just outward of the runway 12, is provided with a projecting lock flange 14, and outward of said flange it is provided with an integrally formed segmental cylindrical so-called knuckle box 15. The top and bottom of the box 15 are flat and are formed with perforated ears or lugs 16 adapting the same to be pivotally connected to the correspondingly formed knuckle box of a gear case, as shown, for instance, in my said companion application, entitled "Knuckle connection and drive for vehicle wheels." Also, the inner end of the wheel hub 6 is provided with a square or angular seat 17, into which the square angular end of a driving knuckle, such as that shown in my said companion application just noted, is adapted to be inserted.

The wheel is held interlocked to the trunnion 11, free for rotation, by means of a lock ring 18, which is screwed into the projecting end of the cylindrical hub flange 9 and overlaps the trunnion flange 14, as best shown in Fig. 2. This lock ring 18 is split or formed in two parts to adapt the same to be placed in working position over the segmental knuckle box 15. Any suitable means may be provided for holding the lock ring 18 against rotation when it is applied in working position to the end of the hub flange 9.

What I claim is:

1. The combination with a wheel provided with a hub having an integrally formed disk-like flange and an integrally formed cylindrical flange projecting from the latter and surrounding said hub, of a hollow trunnion surrounding said hub, spaced apart therefrom and having an integrally formed lock flange, an anti-friction journal interposed between said trunnion and the cylindrical flange of said hub, and a lock ring detachably secured to said cylindrical flange and engageable with the flange of said trunnion and serving to hold said wheel on said trunnion while permitting rotation thereof, substantially as described.

2. The combination with a wheel provided with a hub plate having a cylindrical flange, of a trunnion located within said cylindrical flange, an anti-friction journal interposed between said trunnion and cylindrical flange, said trunnion having a lock flange outward of said journal and a segmental cylindrical knuckle box outward of said lock flange, and a split lock ring screwed into the projecting end of said cylindrical flange, overlapping the said lock flange and serving to hold said wheel on said trunnion while permitting rotation thereof, substantially as described.

3. The combination with a wheel including a hub with a disk-like flange and a cylindrical flange projecting from the latter and spaced apart from and surrounding said hub, the said hub in its projecting end having an angular seat for connection to a driving knuckle, a hollow trunnion surrounding said hub, a ball bearing journal interposed between said trunnion and the cylindrical hub flange, said trunnion having a lock flange outward of said ball bearing device, and a segmental cylindrical knuckle box outward of said lock flange, and a split lock ring screwed into the projecting end of said cylindrical flange, overlapping the lock flange of said trunnion and serving to hold said wheel on said trunnion while permitting rotation thereof, substantially as and for the purposes set forth.

In testimony whereof I affix my signature in presence of two witnesses.

LOUIS MAYER.

Witnesses:
ALICE V. SWANSON,
HARRY D. KILGORE.

---

Copies of this patent may be obtained for five cents each, by addressing the "Commissioner of Patents, Washington, D. C."